US012681376B2

(12) United States Patent
Von Laffert et al.

(10) Patent No.: US 12,681,376 B2
(45) Date of Patent: Jul. 14, 2026

(54) PROJECTION DEVICE FOR GENERATING DYNAMIC PROJECTIONS

(71) Applicant: FEV Group GmbH, Aachen (DE)

(72) Inventors: Felix Von Laffert, Osnabrück (DE); Martin Mueller, Osnabrück (DE); Alf Riedel, Osnabrück (DE)

(73) Assignee: FEV Group GmbH, Aachen (DE)

( * ) Notice: Subject to any disclaimer, the term of this patent is extended or adjusted under 35 U.S.C. 154(b) by 0 days.

(21) Appl. No.: 19/208,056

(22) Filed: May 14, 2025

(65) Prior Publication Data

US 2025/0271745 A1 Aug. 28, 2025

Related U.S. Application Data

(63) Continuation of application No. PCT/DE2023/100867, filed on Nov. 13, 2023.

(30) Foreign Application Priority Data

Dec. 1, 2022 (DE) .......................... 102022131869.9

(51) Int. Cl.
*G03B 21/20* (2006.01)

(52) U.S. Cl.
CPC ....... *G03B 21/208* (2013.01); *G03B 21/2013* (2013.01)

(58) Field of Classification Search
CPC ............................... F21S 41/265; F21V 5/007
See application file for complete search history.

(56) References Cited

U.S. PATENT DOCUMENTS

| | | | |
|---|---|---|---|
| 9,951,919 B2 | 4/2018 | Bauer et al. | |
| 10,232,763 B1 * | 3/2019 | Eckstein | G02B 19/0066 |
| 11,168,857 B2 * | 11/2021 | Lee | F21S 41/40 |
| 11,441,752 B2 * | 9/2022 | Lim | F21S 41/265 |
| 11,644,170 B2 * | 5/2023 | Go | F21S 41/265 |
| | | | 362/520 |
| 2012/0106151 A1 | 5/2012 | Vissenberg et al. | |
| 2019/0072252 A1 * | 3/2019 | Moser | F21S 41/68 |
| 2021/0341123 A1 * | 11/2021 | Mototsuji | F21S 41/143 |

FOREIGN PATENT DOCUMENTS

| | | |
|---|---|---|
| CN | 110260186 | 9/2019 |
| DE | 102009024894 | 12/2010 |

OTHER PUBLICATIONS

International Search Report issued in corresponding International Application PCT/DE2023/100867, mailed Feb. 22, 2024.

* cited by examiner

*Primary Examiner* — Eric T Eide
(74) *Attorney, Agent, or Firm* — Burris Law, PLLC

(57) ABSTRACT

A projection device for generating dynamic projections includes: an arrangement of multiple light sources spaced apart from each other; a collimation optic for generating a parallel beam path from the light sources and a microlens array arrangement within the beam path of the collimation lens. The focal length of the lenses at the illumination side of the microlens array arrangement is larger than the distance of the lenses from a slide plane.

11 Claims, 2 Drawing Sheets

PROJECTION DEVICE FOR GENERATING DYNAMIC PROJECTIONS

CROSS-REFERENCE TO RELATED APPLICATIONS

Figure 1:
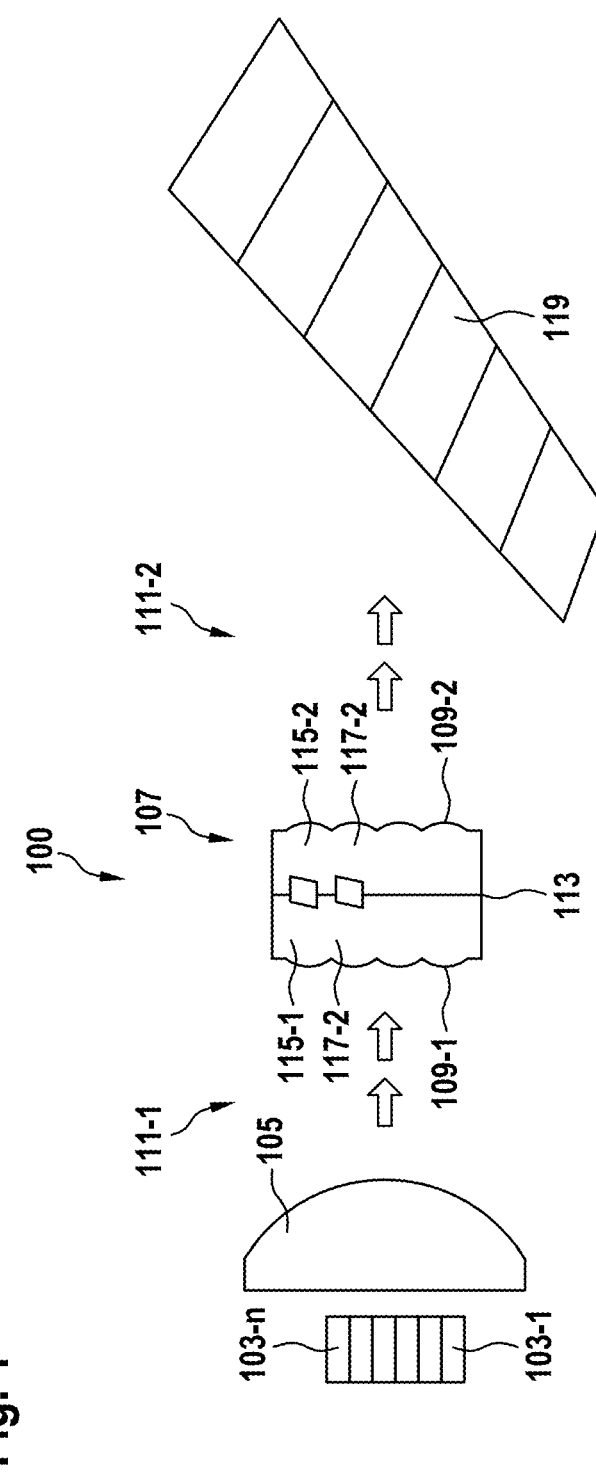

This application is a continuation of International Application No. PCT/DE2023/100867, filed on Nov. 13, 2023, which claims priority to and the benefit of DE 10 2022 131 869.9, filed on Dec. 1, 2022. The disclosures of the above applications are incorporated herein by reference.

FIELD

The present disclosure relates to a projection device for generating dynamic projections and a projection method for generating dynamic projections.

BACKGROUND

The statements in this section merely provide background information related to the present disclosure and may not constitute prior art.

It is possible to illuminate different areas of a projection geometry successively by different projectors, which are switched on one after another. In this case, in order to ensure a seamless transition of picture contents, the projection directions of the projectors have to be aligned precisely with one another. Nevertheless, in spite of coherent graphic contents, it often comes to the occurrence of brightness artifacts in the transitional areas of the projections. Multiple projectors require more space thus leading to increased costs.

Publication DE 10 2009 024 894 A1 describes a projection display having one light source as well as optical channels arranged uniformly. The optical channels comprise a field lens, which is assigned one object structure each to be depicted as well as one projection lens. The distance between the projection lenses and the assigned object structures corresponds to the focal length of the projection lenses, while the distance between the object structures to be depicted and field lens assigned to the same is selected such, that a Köhler illumination of the assigned field lens is ensured. This causes an overlapping of the individual projections into an overall picture.

SUMMARY

This section provides a general summary of the disclosure and is not a comprehensive disclosure of its full scope or all of its features.

The projection device for generating dynamic projections according to the invention, includes: an arrangement of multiple light sources spaced apart from one another; one collimating lens for generating a parallel beam path from the light sources; and a microlens array arrangement within the beam path of the collimating lens. The focal length of the lenses at the side of illumination in the material is greater than the distance of the lenses to a slide plane, is technically advantageous in that it allows for a projection to illuminate image information regionally differently by using a micro-lens array. Thus, it is possible to achieve a dynamization of the projection which goes beyond a mere overall change of brightness.

In one preferred embodiment of the projection device, the light sources are arranged in a linear manner or matrix-shaped, allowing a high dynamization in one or two directions.

In another preferred embodiment of the projection device, the lenses are designed such that they cover the entire area, thus avoiding scattering of light.

In another preferred embodiment of the projection device, the lenses are arranged in a square, rectangular or hexagonal manner, thus further reducing scattering of light.

In another preferred embodiment of the projection device, the focal length of the lenses at an illumination side is greater than the focal length of the lenses at the side of projection, thus ensuring that less light enters the neighboring channels.

In another preferred embodiment of the projection device, the microlens array arrangement is provided a microlens array comprising a carrier and a matrix-shaped arrangement of multiple lenses thus allowing a simplified fabrication of the microlens array.

In another preferred embodiment of the projection device, the carrier and the lenses are designed as single piece allowing an even more simplified fabrication of the microlens array.

In another preferred embodiment of the projection device, the microlens array arrangement comprises a first microlens array at an illumination side and a second microlens array at the projection side thus allowing a number of separate channels.

In another preferred embodiment of the projection device, the focal length of the lenses at the illumination side corresponds to the sum of the thickness of the microlens array at the illumination side and the thickness of the microlens array at the projection side thus allowing a greater acceptance angle of the illumination optics.

The projection method according to the invention comprising the step of illuminating a microlens array arrangement, wherein the focal length of the lenses at the illumination side in the material is larger than the distance of the lenses to a slide plane due to multiple light sources, that are spaced apart from one another, is used for generating dynamic projections. By this method the same technical advantages are achieved as by using the microlens array.

Further areas of applicability will become apparent from the description provided herein. It should be understood that the description and specific examples are intended for purposes of illustration only and are not intended to limit the scope of the present disclosure.

DRAWINGS

Figure 2:
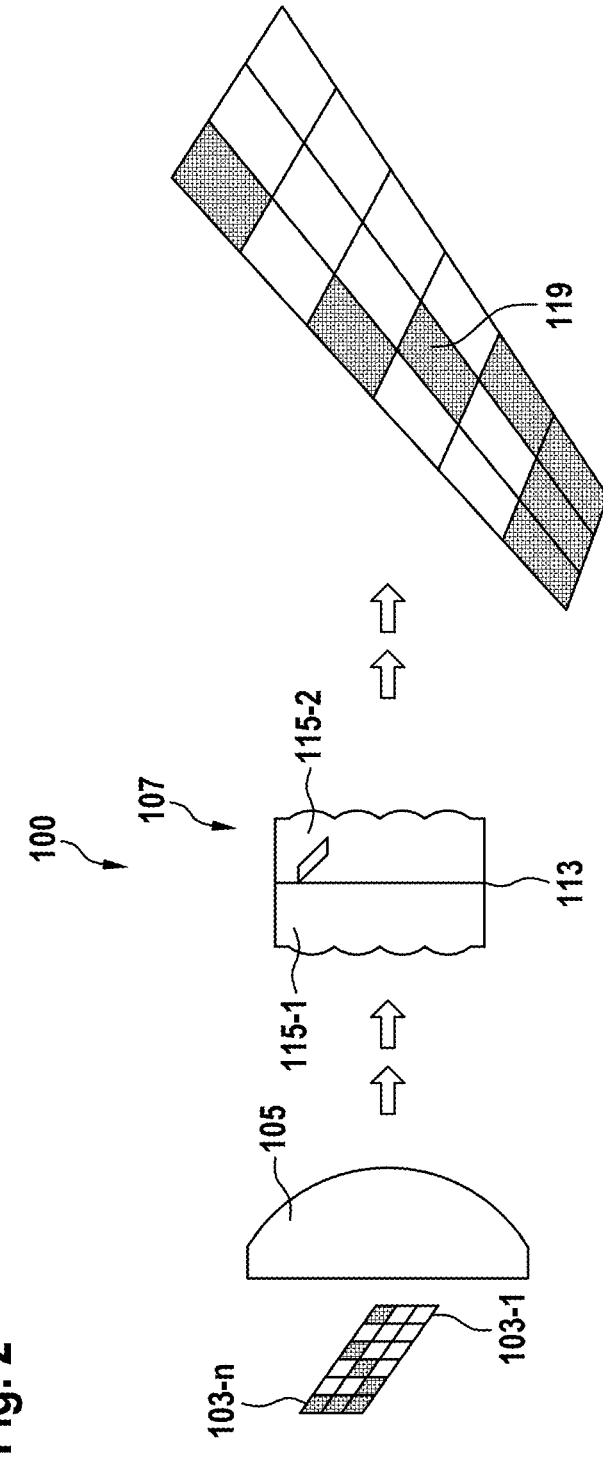

In order that the disclosure may be well understood, there will now be described various forms thereof, given by way of example, reference being made to the accompanying drawings, in which:

FIG. 1 is a schematic representation of a projection device comprising a microlens array; and FIG. 2 is another schematic representation of a projection device comprising a microlens array.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic representation of a projection device 100 comprising a microlens array arrangement 107. The microlens array arrangement 107 comprises two transparent microlens arrays 115-1 and 115-2, and a slide plane 113 arranged therebetween. In slide plane 113, the associated image information, which is to be projected, is stored. The microlens arrays 115-1 and 115-2 comprise a matrix-shaped arrangement of multiple lenses 109-1 and 109-2, which are arranged on their respective carriers 117-1 and 117-2. The projection device 100 is designed such that the position of a light source 103-1, 103-n is projected roughly into the angular space by means of collimation optics and individual regions of the light entry surface from this light are cut out by means of the lenses 109-1 at the illumination side 111-1.

The microlens array 115-1 causes the illuminating light to be split into individual channels. Inside the individual channel close to lens 109-1, an associated micro-image is located in the slide plane 113. The proximity to lens 109-1 causes the micro-image to be as evenly illuminated as the illuminating light at the point of lens 109-1. The individual micro-image is projected by the lens 109-2 at the projection side 111-2 onto the projection geometry 119, arranged in a three-dimensional manner, for instance in form of an even surface or a road.

Since the projection device 100 comprises individual channels, which are projecting from similar perspectives onto the projection geometry 119, the respective micro-images in the slide-plane 113 display strong similarities. In general, there are minor shifts in the position of the micro-image within the channel dimensions as compared to those in a neighboring channel. The extent of the differences in the image information in the individual channels are caused by the typical distances of the individual channels in the range of about 1000 μm and typical projection distances between 10 cm and 10 m.

According to the optical principle of integral photography, the projected images overlap as light field as well as on the projection geometry, thus resulting in a sharpness of detail, which dissolves much finer details than would be possible by a projection using a single channel. Moreover, by integral superposition of the individual channels it is possible to construct a geometry of highest image definition corresponding precisely to the projection geometry 119. Similarly, the sum of the positions of highest image definition in an integral image, when looking at the lenses 109-1 is located in the geometry of the objects arranged in a three-dimensional manner. To that extent the three-dimensional position of the projection geometry 119 is stored as part of the image construction in relation to the microlens array arrangement 107.

Single light sources 103-1, . . . , 103-n, positioned at different points, are projected from one or more lenses into different angle areas by means of collimating optics 105, thus illuminating the microlens array 115-1, wherein the lenses 109-1 are provided a distance from the slide plane 113 corresponding at most to the focal length of the lenses 109-1. By activating the individual light sources 103-1, . . . , 103-n an image formation of the slide plane 113 is regionally differently illuminated and projected onto the projection geometry 119.

Part of the light of a channel in a lens 109-2 at the projection side 111-2 can enter another channel, thus creating a so-called ghost image (channel cross talk). Thus, it is advisable to select the focal length of the lenses 109-1 at the illumination side 111-1 slightly larger than the thickness of the microlens array 115-1 at the illumination side. In this manner less light enters the neighboring channel. The further away the plane of the images of light source 103-1, . . . , 103-n is from slide plane 113, the lesser localized is the illumination. Thus, it is possible to achieve a soft-focus effect. As a result, on the one hand, gaps between the images are less visible when the light sources 103-1, . . . , 103-n are arranged spaced apart and on the other hand, when the light sources 103-1, . . . , 103-n are switched dynamically, less sudden or more steady changes in the illumination of the image contents can be achieved.

The light sources 103-1, . . . , 103-n can be provided by six light emitting diodes of rectangular shape, arranged linearly in one direction and side by side. The same are displayed in the angular space by means of collimation optics 105. The lenses 109-1 caused the images of the light emitting diodes to appear 109-1 in the slide plane 113.

In this embodiment, the values for the thickness of the microlens array 115-1 at the illumination side 111-1, the focal length of the lenses 109-1 at the illumination side 111-1, the thickness of the microlens array 115-2 at the projection side 111-2 and the focal length of the lenses 109-2 at the projection side 112-2 correspond to one another. The thickness of the microlens array 115-2 at the projection side 111-2 is to be understood as the space between the lenses 109-2 at the projection side 111-2 and the slide plane 113. The thickness of the microlens array 115-1 at the illumination side 111-1 is to be understand as the space between the lenses 109-1 at the illumination side 111-1 and the slide plane 113.

However, it can be advantageous to select the focal length of the lenses 109-1 at the illumination side 111-1 larger than the focal length of the lenses 109-2 at the projection side 111-2. When the focal length of the lenses 109-2 at the projection side 111-2 largely corresponds to the thickness of the microlens array 115-2 at the projection side 111-2, then the focal length of the lenses 109-1 at the illumination side 111-1 is larger than the thickness of the microlens array 115-2 at the projection side. In this way less light enters the neighboring channels. Thus, the more the focal length of the lenses 109-1 at the illumination side 111-1 corresponds to the sum of the thickness of the microlens array 115-1 at the illumination side 111-1 and the thickness of the microlens array 115-2 at the projection side 111-2, the greater is the acceptance angle of the illumination optics resulting in fewer ghost images. The light sources 103-1, . . . , 103-n are projected onto the lenses 109-2 of the projection side 111-2. If the focus is more on the slide plane 113 then smaller angle images of the light sources 103-1, . . . , 103-n are used. This can be achieved by bigger collimation optics 105 or smaller light sources 103-1, . . . , 103-n.

By projecting the illumination light onto the slide plane 113, the light sources 103-1, . . . , 103-n are not displayed point by point but are displayed in areas of the micro images in the slide plane 113. But since the micro images in the individual channels are slightly shifted against each other, the illumination of the same also shifts slightly in relation to the image content. Thus, the illumination is fuzzier at the otherwise same position of the image contents on the projection geometry. In this case each of the individual light sources 103-1, . . . , 103-n illuminates an allocated region in the micro images and thus illuminates directly a correspondingly allocated region in the projection geometry.

The projection device 100 allows to create a projection by means of a microlens array arrangement 107 which can illuminate a projected image information from the slide plane locally different depending on which of the light sources 103-1, . . . , 10n has been activated. Thus, it is possible to create a dynamization of the projection which exceeds a mere all over change in brightness of the projection. Such dynamic illumination can be created for instance in the way, how different regions of a projected wiper indicator of a motor vehicle are illuminated, but many other ways are also conceivable.

It is advantageous to design the lenses 109-2 at the illumination side 111-1 covering the full surface, for instance in a square, rectangular or hexagonal arrangement. Thus, it is possible to avoid stray light, which can occur when in circular lenses 109-1 light with various angles enters into the microlens array 115-1 in the area between the individual lenses 109-1 and illuminates the micro images regionally not as intently as the images of the light sources 103-1, . . . , 103-n.

In addition, it is also advantageous to design the lenses 109-2 at the projection side 111-1 covering the full surface for instance by arranging them in a square, rectangular or hexagonal shape. Thus, it is possible to avoid stray light, which can occur when light escapes from between the lenses 109-2 light thus contributing to channel cross talk. The arrangement of the light sources 103-1, . . . , 103-n can for instance, comprise 5 light-emitting diodes arranged in one direction side by side or by a matrix with 10 times 10 light-emitting diodes.

FIG. 2 shows an embodiment of an arrangement comprising 3 times 6 light-emitting diodes as light sources 103-1, . . . , 103-n, which are square-shaped and arranged in a matrix. Glowing light sources are shown shaded at the level of the light-emitting diodes as well as at the level of the projected images on the projection geometry. The image content of the micro images from the slide plane 113 has not been shown. A soft-focus effect caused by defocusing the light-emitting diodes has also not been shown.

The same are displayed in the angle space by means of the collimation optics 105. The lenses 109-1 caused the images of the light emitting diodes to appear next to the slide plane 113 with the micro images. In this embodiment the values for the thickness of the microlens array 115-2 at the projection side 111-2 matches the focal length of the lenses 109-2.

The thickness of the microlens array 115-1 at the illumination side 111-1 is larger than the thickness of the microlens array 115-2 at the projection side 111-2. The focal length of the lenses 109-1 at the illumination side 111-1 is larger than the thickness of the microlens array 115-1 at the illumination side 111-1.

The invention allows for a variable projection in the form of a localized variable illumination of the image content in the projection geometry 119 thus minimizing additional cost as compared to conventional projectors having a microlens array. This is achieved by selecting the thickness of the microlens array 115-1 smaller than the focal length of the lenses 109-1 and by using a plurality of light sources 103-1, . . . , 103-n.

The projection device 100 allows to realize welcome scenarios or safety relevant dynamization in a projection. So, for instance, it is possible for projected zebra-crossings to be switched on and off one after another from one side to the other side. Because of its dimensions, the projection device 100 is particularly suited for the automotive sector, for instance as light installation or as projected indicator, dynamic symbolic projection in hotels or airplanes, effect lighting, as guidance projections, or as danger zone projections in buildings.

All features which have been described and shown in the drawings in connection with the individual embodiments of the invention can be implemented by the subject-matter of the invention, in order to realize the advantages of the same.

All process steps can be implemented by devices that are suitable for executing the respective step. All functions that are executed by the features of the subject-matter of the invention can constitute a process step.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A projection device for generating dynamic projections, comprising:
   an arrangement having a plurality of light sources spaced apart from each other, the plurality of light sources being configured to be independently controlled to dynamically and locally change illumination of the projections;
   a collimation optic for generating a parallel beam path from the light sources; and
   a microlens array arrangement in the beam path of the collimation optic, wherein a focal length of lenses at an illumination side of the microlens array arrangement is larger than a distance of the lenses to a slide plane of the microlens array arrangement.

2. The projection device according to claim 1, wherein the light sources are arranged in a linear manner or in a shape of a matrix.

3. The projection device according to claim 1, wherein the lenses are designed for covering an entire surface.

4. The projection device according to claim 3, wherein the lenses are arranged in a square, rectangular or hexagonal manner.

5. The projection device according to claim 1, wherein the focal length of the lenses at the illumination side is larger than a focal length of lenses at a projection side of the microlens array arrangement.

6. The projection device according to claim 1, wherein the microlens array arrangement comprises a microlens array having a carrier and a matrix-shaped arrangement comprising a plurality of lenses.

7. The projection device according to claim 6, wherein the carrier and the lenses are designed as single piece.

8. The projection device according to claim 1, wherein the microlens array arrangement comprises a first microlens array at the illumination side and a second microlens array at a projection side.

9. The projection device according to claim 1, wherein the focal length of the lenses at the illumination side corresponds to a sum of a thickness of the microlens array at the illumination side and the thickness of the microlens array at the projection side.

10. A projection method for generating dynamic projections, comprising a step of illuminating a microlens array arrangement by a plurality of light sources spaced apart from each other by independently controlling the plurality of light sources to dynamically and locally change illumination of the projections, wherein a focal length of lenses at an illumination side of the microlens array arrangement is larger than a distance of the lenses to a slide plane of the microlens array arrangement.

11. The projection device according to claim 1, further comprising image information stored in the slide plane.

* * * * *

8